United States Patent [19]

Tennes et al.

[11] 4,208,861
[45] Jun. 24, 1980

[54] MECHANICAL SHAKER ASSEMBLY FOR CONTINUOUS HARVESTING OF FRUIT

[75] Inventors: Bernard R. Tennes, Charlotte; Galen K. Brown, Okemos, both of Mich.

[73] Assignee: The United States of America as represented by the Secretary of Agriculture, Washington, D.C.

[21] Appl. No.: 945,954

[22] Filed: Sep. 26, 1978

[51] Int. Cl.² ............................................. A01D 46/00
[52] U.S. Cl. .................................... 56/328 TS; 74/42; 74/86
[58] Field of Search ............... 56/328 TS, 328 R, 329, 56/330; 366/108; 74/86, 42

[56] References Cited

U.S. PATENT DOCUMENTS

| | | |
|---|---|---|
| 2,372,769 | 4/1945 | DeRemer ............................... 74/86 |
| 2,881,620 | 4/1959 | Nordengren ......................... 366/108 |
| 3,187,493 | 6/1965 | Harrett ..................................... 56/330 |
| 3,584,446 | 6/1971 | Bernshausen ...................... 56/328 R |
| 3,771,301 | 11/1973 | Favor .................................. 56/328 R |
| 3,793,815 | 2/1974 | Hughes ............................. 56/328 TS |
| 3,812,662 | 5/1974 | Savage ............................. 56/328 TS |
| 4,064,683 | 12/1977 | Tennes et al. .................... 56/328 TS |

*Primary Examiner*—Jay N. Eskovitz
*Attorney, Agent, or Firm*—M. Howard Silverstein; David G. McConnell; Curtis P. Ribando

[57] ABSTRACT

A mechanical shaker assembly adapted for use with an over-the-row power frame for the continuous harvesting of horticultural crops uniquely combines oscillating sway bars for dislodging the crops with a pendulum system for absorbing vibrations otherwise transmitted to the power frame by the sway bars.

7 Claims, 5 Drawing Figures

MECHANICAL SHAKER ASSEMBLY FOR CONTINUOUS HARVESTING OF FRUIT

BACKGROUND OF THE INVENTION

1. Field of the Invention

This invention relates to the mechanized harvesting of horticultural crops. Of particular interest is the harvesting of fruit from fully dwarfed and semidwarf trees, and especially apple trees grown in hedgerow orchards.

The recent trend in orchard plantings has been toward the smaller varieties of trees planted in hedgerows or tree walls. With the fully dwarfed and semidwarf trees, higher yields per acre are possible. They also lend themselves to rapid and more economical harvesting methods, particularly with mechanized systems. Another advantage lies in their ability to bear fruit in the first year of orchard growth. This reduces the nonproductive time of a newly established orchard, and permits the grower to change in a short time from one variety of fruit to another as market demands dictate. Moreover, during the harvesting operation, the shorter the distance the fruit drops, the less the likelihood of damage. This increases the overall quality of the fruit and the yield for fresh market use.

2. Description of the Prior Art

Since the advent of the mechanical fruit harvester, a variety of systems and designs have been developed. Many are discussed in "Mechanical Harvesting and Handling for Apples," Everett D. Markwardt et al. (In Fruit and Vegetable Harvest Mechanization-Technological Implications, Cargill and Rossmiller, eds., ASAE, St. Joseph, Mich., 1969, pp. 635–652). Most devices were designed for use on standard-sized fruit trees and employ the stop-and-shake method. In this type of operation, the mechanical limb or trunk shaker affixed to a vehicle or harvester is driven up to the tree, maneuvered into position, clamped to the tree, activated, then removed from the tree and advanced to the next. Such apparatuses are taught in U.S. Pat. Nos. 3,771,301, 3,793,815, and 3,812,662.

Disadvantages of the standard stop-and-shake method are numerous when operated in modern hedgerow orchards where the number of trees per hectare is 5–10 times that of the standard tree orchards. The discontinuity of the process as described above is time consuming and inefficient, and normally it takes 5–10 minutes to harvest a single semidwarf tree.

Various systems have been designed specifically for harvesting in hedgerow orchards and have eliminated some of the stop-and-shake deficiencies. U.S. Pat. No. 3,187,493 discloses a stop-and-go, bush-straddling berry harvester equipped with oscillating bars for shaking the bushes. In U.S. Pat. No. 3,584,446 F. Bernshausen shows a continuous over-the-row harvesting system employing either a telescoping clamp-type trunk shaker or an oscillating belt trunk shaker which allows the harvester to pass down the hedgerow without stopping. In related U.S. Pat. No. 4,064,683 Tennes et al. have adapted an oscillating mass system to a continuous over-the-row harvester, wherein rotating weights are positioned in each of a pair of shaker units designed to act on opposite sides of the tree trunk. Though these systems are improvements over the conventional stop-and-shake devices, they are variably effective in their percentage of fruit recovery, and are susceptible to breakdowns because of vibrational forces transmitted to the power frame.

SUMMARY OF THE INVENTION

The applicants have now invented a novel mechanical shaker assembly adapted for use in combination with an over-the-row power frame for continuous and efficient harvesting of horticultural hedgerow crops. The shaker is uniquely capable of imparting a swaying motion to the foliage, resulting in an unexpectedly high percentage of crop recovery, while transmitting virtually none of the excess vibrational forces to the power frame itself. The swaying motion is accomplished by a pair of oscillating sway bars symmetrically mounted on the lateral sides of the power frame, spaced to permit contact with opposite sides of the hedgerow, and synchronously driven by paired reciprocating mechanisms. The energy generated by the reciprocating mechanisms and not absorbed by the hedgerow is transmitted as reaction energy back through the sway bars and is absorbed by a pair of free-swinging pendulums. The cooperation between the reciprocating mechanisms and the pendulums produces the surprising advantages herein described.

In accordance with this discovery, it is an object of the invention to provide a device for mechanically harvesting horticultural crops in an efficient, continuous manner.

More specifically, it is an object of the invention to provide a mechanical shaker assembly adapted for use with an over-the-row power frame in harvesting crops grown in hedgerows, particularly from fully dwarfed or semidwarf fruit trees.

It is another object of the invention to provide a mechanical shaker assembly with means for absorbing reaction energy and preventing transmission of vibrational forces to the power frame.

It is also an object of the invention to mechanically harvest crops without permanently damaging the plants upon which they grow.

These and other objects and advantages of the invention will become apparent from the following description and from the accompanying drawings.

DETAILED DESCRIPTION OF THE INVENTION

The continuous mechanized system of the instant invention has application for all types of horticultural crops, or fruits, which can be harvested by shaking the plants upon which they grow. The terms "crops" and "fruits" as used throughout the disclosure are defined herein in their broadest sense to include any product of plant growth useful to man or animals. Examples without limitation thereto are apples, pears, peaches, nectarines, plums, cherries, citrus fruit, cane fruit, blueberries, grapes, nuts, pine cones, and others. Of particular interest are fruits grown on fully dwarfed or semidwarf trees grown in hedgerows, especially apples. In the ensuing description, it is understood that reference to trees is merely illustrative, and that the invention is applicable to cane, stalk, and vine plants as well.

The term "continuous" as used throughout the disclosure means "without cessation." The harvesting apparatus incorporating the instant shaker assembly is continuous in the sense that its forward motion does not cease as it passes along the tree rows during harvesting, notwithstanding that the shaker assembly may be operated either continuously or in intermittent cycles. Of course, it is within the scope of the invention that the power frame may be operated in a noncontinuous manner if so desired.

Figure 1:
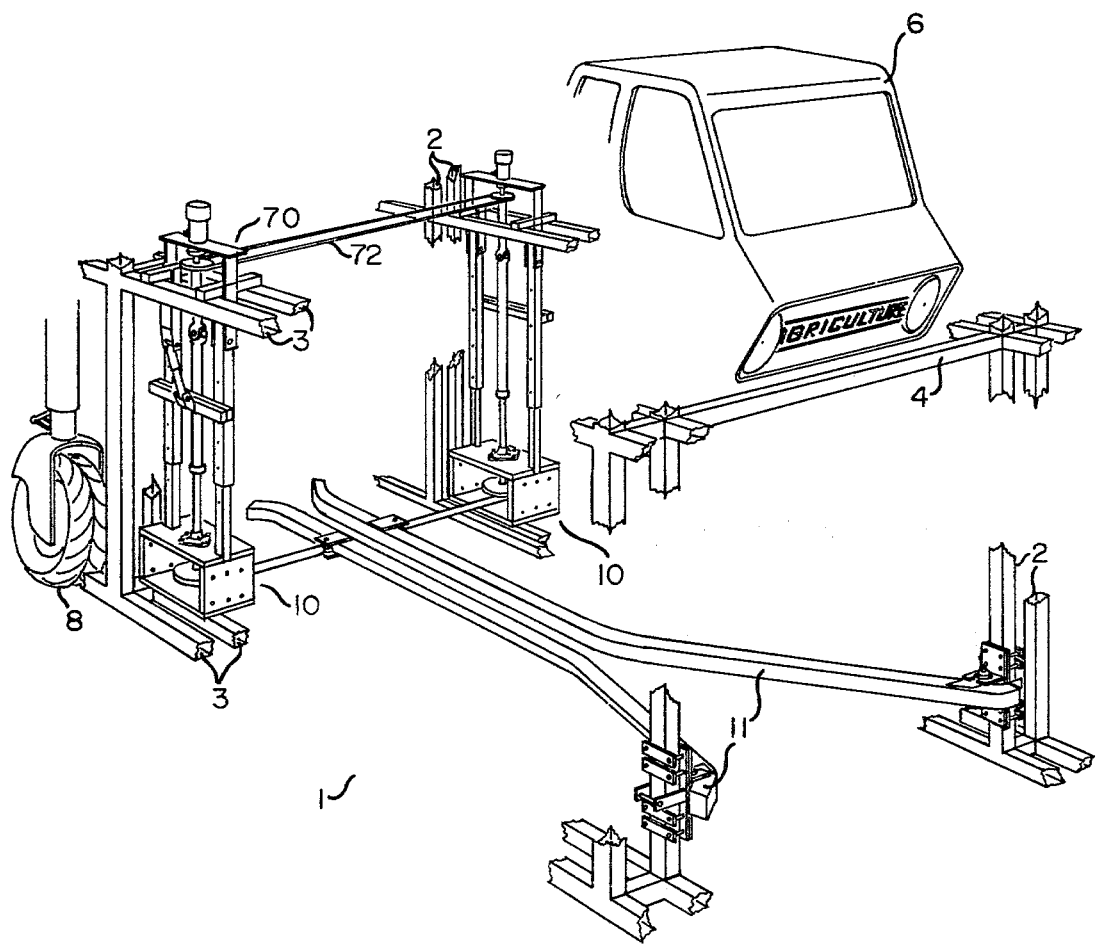
FIG. 1 is a perspective view of the mechanical shaker assembly in combination with an over-the-row power frame.

As is illustrated in FIG. 1, the novel shaker assembly is designed for use in combination with a conventional over-the-row power frame 1. The frame itself does not constitute part of the invention and will be described only to the extent necessary for an understanding of how it cooperates with the invention. The frame basically comprises vertical struts 2 interconnected by longitudinal side members 3 and by upper transverse members 4. It includes an operator's cab 6 and is powered by a motor and gearing mechanism (not shown) for driving the transport wheels 8. It may also be equipped with side and top enclosure panels, foliage rollers, catching frames, conveyors, and other crop handling apparatus such as disclosed in related U.S. Pat. No. 4,064,683, referred to above and herein incorporated by reference. The general design of the power frame permits its adaptation to other horticultural functions including planting, spraying, fertilizing, pruning, and plant removal. The components for each operation can be designed for ready attachment, permitting rapid conversion between functions. This versatility enhances the economic attractiveness of the instant shaker assembly.

Figure 2A:
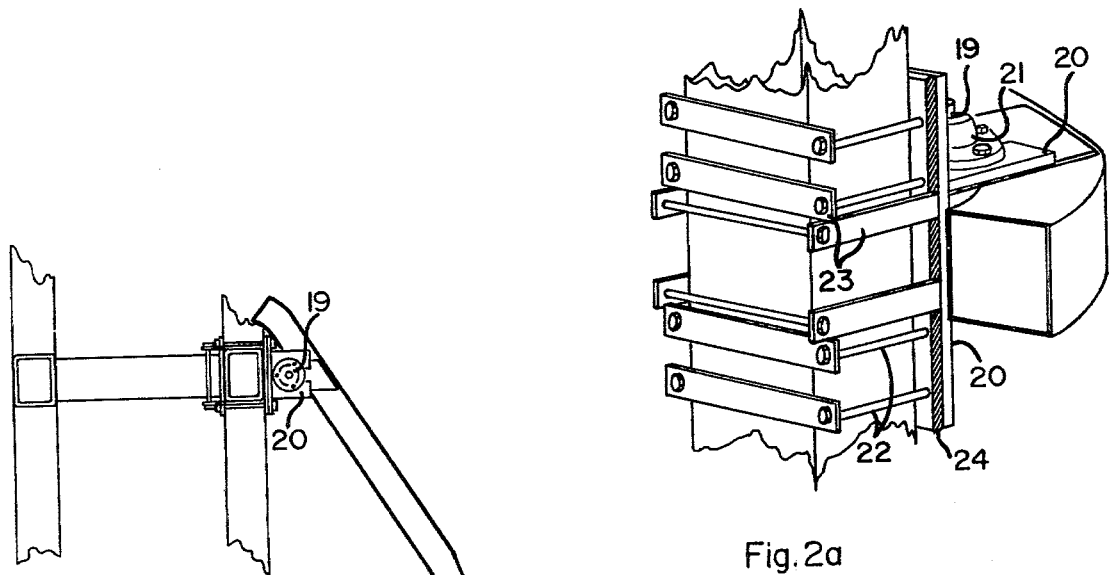
FIG. 2a is a detail perspective view of the right front sway bar mount.
Figure 2:
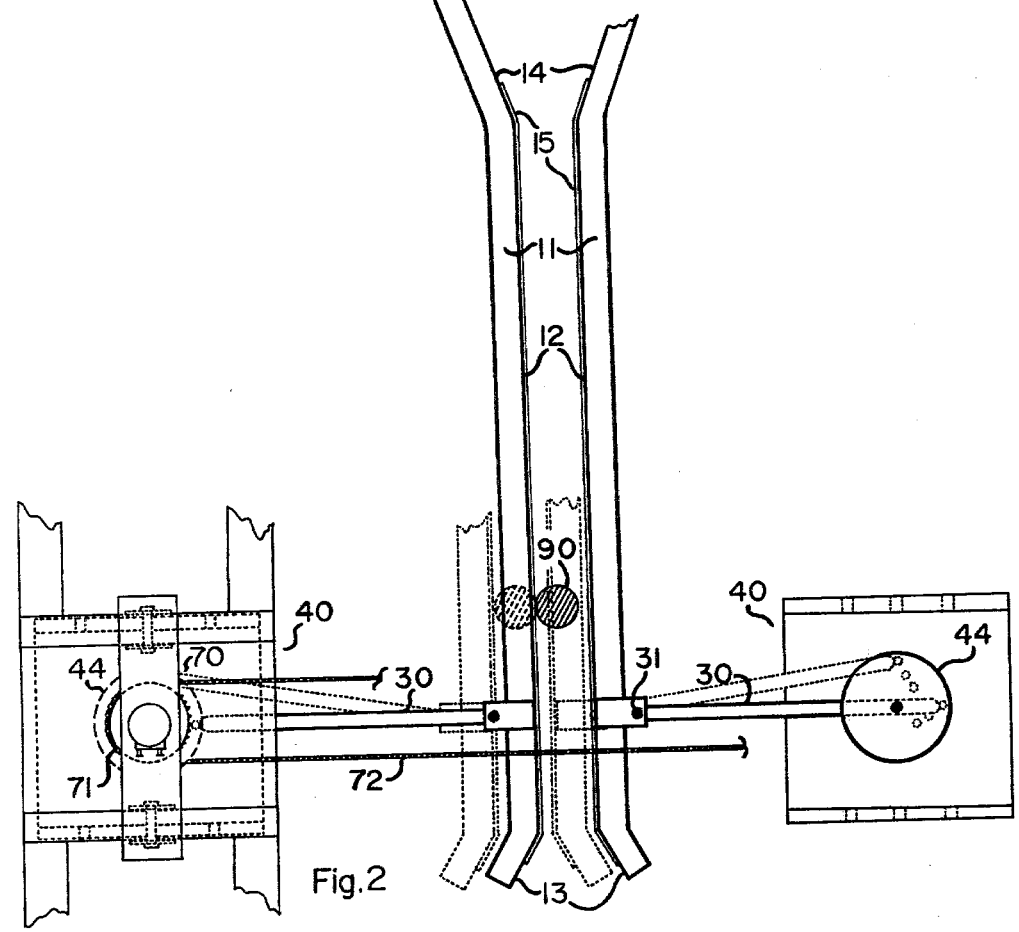
FIG. 2 is a top plan view of the mechanical shaker assembly with the right inertia wheel exposed.

As illustrated in FIGS. 1 and 2, the shaker assembly comprises a pair of substantially identical shaker units 10, symmetrically mounted on the respective sides of the power frame. The units are designed for synchronous side-to-side operation, thereby imparting a swaying motion to the horticultural trees.

Each shaker unit comprises a sway bar 11 which is positioned parallel to the ground and at a height for physically contacting the trunk or center leader of the tree 90. A section of the sway bar 12 near the rear is substantially straight and parallel to the corresponding section of the other bar. Each is tapered outwardly at the rearmost end 13 where the amplitude of motion is greatest and where the bar would otherwise tend to gouge the tree. The forward sections 14 of the sway bars also diverge outwardly from one another to permit easy entry of the tree. To minimize the inertial input, the bars are preferably constructed from steel tubing or other lightweight material which is sufficiently durable to withstand the stresses incurred during operation. The medial surface may also be covered with a wear-resistant, low-friction padding 15 for minimizing abrasive damage to trees having particularly tender bark.

As shown in detail in FIG. 2a, the forward ends of the sway bars are pivotally secured at points 19 to front mounts 20 by bearings 21 or similar means. The mounts are fastened to the power frame by bolts 22 and brackets 23 so as to be vertically adjustable. An elastic cushioning material 24 may be provided between the mounts and power frame for dampening any transmitted vibrations. The straight sections 12 of the sway bars near the rear are pivotally fastened to connecting rods 30 at points 31 by ball joints or other means permitting freedom of movement in both the vertical and horizontal planes. The rods are oriented approximately perpendicular to the sway bars and the approximate centers of percussion along the lengths of the bars under loaded conditions are selected as the actual connecting points 31.

Figure 3:
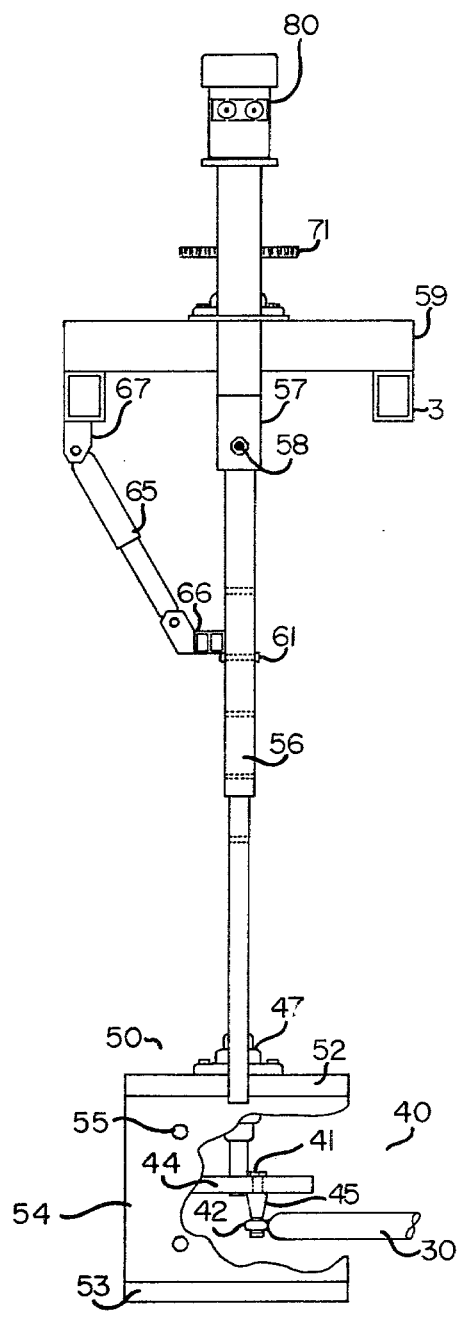
FIG. 3 is a partially cut-away front elevation view of one of the pendulum-mounted crank assembly units.
Figure 4:
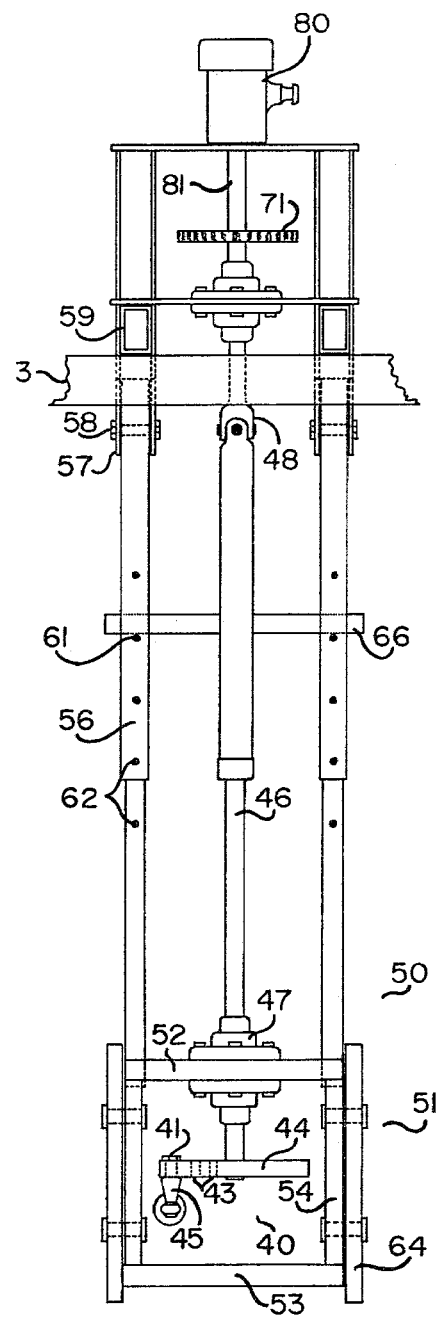
FIG. 4 is a side elevation view of one of the pendulum-mounted crank assembly units.

The connecting rods are reciprocated by pendulum-mounted crank assemblies 40 as illustrated in FIGS. 2, 3, and 4. The rods and crank assemblies collectively comprise the reciprocating mechanisms. Each rod is secured to a crank pin 41 by a flexible joint 42 similar to that used for connection to the sway bar at point 31. The crank pin is removably secured into one of a series of crank arm adjustment holes 43 in inertia wheel 44. The crank pin and inertia wheel together constitute a crank. Spacer 45 allows for clearance between the rod and the wheel as the angle between them decreases. The inertia wheel is positioned in the approximate center of percussion of the pendulum 50 and is rotated by means of an extendable crankshaft 46 driven by hydraulic motor 80 or other suitable power source. The crankshaft is journalled to the top plate 52 of the pendulum bob 51 by means of bearings 47. A universal joint 48 in line with pivot pins 58 connects the crankshaft to power shaft 81 to permit oscillation of the crank assembly with the pendulum. It is readily apparent that the design of the crank assembly enables it to transform the rotary motion of the power source into the reciprocating motion of the rod.

The pendulum bob 51 comprises aforementioned top plate 52 connected on either end to bottom plate 53 by means of side plates 54. The side plates are equipped with any number of bolt holes 55 for attachment of additional weights 64 as desired. The pendulum bob hangs by adjustable arms 56 from pivot plates 57 and pivot pins 58. The pivot plates are secured to pendulum supports 59 which are attached to longitudinal side members 3 of power frame 1. While it is understood that the pendulum could be hung by alternate means such as by mounting it on an elastic material, it is preferred to restrict its rotational movement to the transverse vertical plane. The pendulum is free-swinging in the sense that its rotation about pivot pin 58 is not positively linked to the stroke of the crank assembly and the sway bar. That is, the motor 80 which drives the crank assembly does not also directly drive the pendulum. However, by virtue of the crank being mounted in the pendulum, the freedom of pendulum rotation permits the sway bar spacing to vary as necessary to compensate for oversized trees or misalignment over the hedgerow. A shock absorber 65 or other conventional dampening device attached to mounts 66 and 67 is also provided between the pendulum arm and the power frame in order to further dampen vibrations transmitted from the sway bars and to provide positional stability to the pendulum as the power frame passes over irregular surfaces.

A synchronizing assembly 70 maintains the respective crank assemblies at identical speeds of rotation and in phase with one another. The assembly in FIGS. 2 and 4 comprises a sprocket 71 mounted on each of the power shafts 81. The respective sprockets are positively interconnected by chain 72, which may be horizontally supported by guide bearings or idler sprockets (not shown) as known in the art. Of course, equivalent modes of synchronization such as cranks or geared rods could be substituted for the chain assembly.

The shaker assembly is adjusted for effective harvesting by spacing apart the sway bars under no-load conditions slightly more than the average tree diameter to be harvested. This adjustment is made by employing either a variable length connecting rod or interchangeable rods of different lengths. The height of the sway bars above the ground may be varied by adjusting the position of the front mounts 20 and by adjusting the lengths of the pendulum arms 56 by means of pins 61 and holes 62. To minimize the energy transmitted to the root system, it is preferred to contact the tree at its percussion point, which is normally up from the ground about one-third of the tree's height. The weight of the pendulums with respect to the energy transmitted thereto from the sway bars may be optimized by varying the amounts of additional weights 64 which can be bolted to side plates 54. The sway frequency is controlled by the speed of the motors 80 powering inertia wheels 44, and the amplitude is dependent upon the selected crank arm between crank pin 41 and the center of the inertia wheel. As mentioned above, the crank arm can be varied by repositioning the crank pin 41 in one of the adjustment holes 43. By virtue of the sway bar pivoting on the power frame and being driven by a single connecting rod, the amplitude of vibration is also a function of the distance along the sway bar from front pivot point 19, increasing from zero at the pivot point to a maximum value near the rear of the bar. The shaking period, that is, the duration that the sway bars are in contact with a given tree is related to both the length of the contact zone of the sway bars and the speed of advancement of the power frame along the tree row. The length of the bars should therefore be selected in accordance with the crop type and maximum advancement speed at which an acceptable percentage of the crop can be recovered.

OPERATION OF THE PREFERRED EMBODIMENT

In the preferred operation of the invention, the trees have been pruned so that the sway bars can contact the trunk or central leader unencumbered by interfering branches and other foliage in the horizontal plane of the bars. However, preliminary tests have proven that such pruning is not necessary for efficient harvesting, particularly for the smaller varieties of trees, and of course for bushes, canes, and vines. As the harvester advances over a hedgerow tree, the sway bars alternately contact the tree on opposite sides as the bars oscillate in a synchronized side-to-side motion. Thus, throughout each cycle, the bars move simultaneously, first to one side, then to the other side, thereby acting to maintain the spacing between them substantially constant at any given point along their length. The initial contact made by the more widely spaced forward sections of the sway bars is sufficiently gentle to remove only the most readily detachable fruit. As the harvester continues, the bar spacing diminishes and the amplitude of oscillation increases as a function of the distance from the front pivot to the point of contact, resulting in a greater energy input to the hedgerow and in the sequential recovery of progressively tenacious fruit. Substantially all of the reaction energy transmitted back through the sway bars and the connecting rods is absorbed by the free-swinging pendulums. Moreover, if the harvester encounters a tree having a width greater than the preset spacing between the sway bars, or if the harvester is misaligned over the tree row, the pendulums simply spread apart to compensate for the difference. The efficacy of the shaker assembly in regard to both energy input and reaction energy absorption is attributed to the critical placement of the inertia wheels and connecting rods in the approximate centers of percussion of the pendulums as noted above.

Depending on the fruit being harvested, the sway frequency of the bars 11 will normally vary between about 50 and 1000 cycles/minute, and at points 31 where the bars are fastened to the connecting rods, the stroke (stroke=2X amplitude) will vary from about 5 to 30 cm. It is anticipated that for most harvesting operations the power frame will be able to advance over a hedgerow at a speed of about 1.5 to 8 km./hour and recover up to 100% of the fruit with a shaking period of about 1.5 to 7 seconds per plant.

It is understood that the foregoing detailed description is given merely by way of illustration and that modification and variations may be made therein without departing from the spirit and scope of the invention.

We claim:

1. A mechanical shaker assembly apparatus adapted for attachment to an over-the-row power frame for continuous harvesting of horticultural crops, comprising:
   first and second sway bars which are substantially parallel to one another for at least a portion of their length;
   means for synchronously reciprocating said first and second sway bars in a substantially constant spaced relationship with one another; and
   first and second free-swinging pendulums fastened to said first and second sway bars, respectively, and having rotation about a pivot point for absorbing reaction energy generated by said reciprocating means.

2. The apparatus as described in claim 1 wherein said substantially parallel portions of said sway bars comprise the rearward sections of said bars, and the forward sections of said sway bars diverge outwardly from one another.

3. The apparatus as described in claim 2 wherein said forward sections of said sway bars are adapted for pivotal attachment to said power frame.

4. The appratus as described in claim 1 wherein said synchronous reciprocating means comprises first and second crank assemblies for reciprocation of said sway bars, wherein each of said crank assemblies comprises a crank rotated by a crankshaft and said crank is drivably fastened to one of said sway bars by means of a connecting rod.

5. The apparatus as described in claim 4 wherein said connecting rod is fastened to said substantially parallel portion of said sway bar.

6. The apparatus as described in claim 4 wherein said crank is positioned in the approximate center of percussion of the corresponding pendulum, and said crankshaft is journalled to said pendulum by means of at least one bearing and is free to pivot with said pendulum.

7. The apparatus as described in claim 4 wherein each of said crank assemblies further comprises a sprocket mounted on said crankshaft for rotation therewith and wherein said crank assemblies are positively interconnected by a synchronizing chain riding on said sprockets.

* * * * *